United States Patent [19]
Tanaka et al.

[11] 3,940,686
[45] Feb. 24, 1976

[54] LINEAR OUTPUT BRIDGE CIRCUIT

[75] Inventors: Kozo Tanaka, Fujisawa; Tetsuyuki Onoda, Yokohama, both of Japan

[73] Assignee: Honeywell Inc., Minneapolis, Minn.

[22] Filed: Apr. 1, 1974

[21] Appl. No.: 456,706

[30] Foreign Application Priority Data
June 18, 1973 Japan.............................. 48-68447
Aug. 6, 1973 Japan.............................. 48-92636

[52] U.S. Cl................ 323/75 B; 323/75 H; 323/80
[51] Int. Cl.² ........................................ G01K 7/02
[58] Field of Search................... 323/75 B, 75 H, 80

[56] References Cited
UNITED STATES PATENTS

| | | |
|---|---|---|
| 2,932,784 | 4/1960 | Hampton........................... 323/75 B |
| 3,443,215 | 5/1969 | Bradley.............................. 323/75 B |
| 3,722,283 | 3/1973 | Treharne et al. ................. 323/75 H |

*Primary Examiner*—A. D. Pellinen
*Attorney, Agent, or Firm*—Trevor B. Joike; Henry L. Hanson

[57] ABSTRACT

A digital set point circuit comprised of a plurality of resistors arranged in a bridge circuit with a condition sensor and switchably controlled to characterize the condition sensor to provide a substantially linear output from the bridge.

8 Claims, 4 Drawing Figures

3,940,686

LINEAR OUTPUT BRIDGE CIRCUIT

BACKGROUND OF THE INVENTION

This invention relates to a setting circuit for use with a temperature regulator or the like, and more particularly to a digital setting circuit wherein a straight-line-segment approximation of the nonlinear temperature-resistance characteristic of a measuring resistor is provided. In a second embodiment, a straight-line-segment approximation of the nonlinear temperature-electromotive force of a thermocouple is provided.

For temperature regulation performed through the comparison of the temperature sensed by a measuring resistor or a thermocouple and a set point temperature, the analog setting technique employing a potentiometer is adopted for the most part. In such a setting technique, the nonlinearity of the measuring resistor or the thermocouple can easily be compensated by properly calibrating the indicator scale of the instrument. When a digital setting technique is adopted, however, such nonlinearity raises a problem.

Digital linearization of this nonlinearity has been the only solution provided by the prior art, and a setting circuit wherein a straight-line-segment approximation of the nonlinearity in the digital fashion is provided on the setting side has not been suggested yet.

It is therefore the object of this invention to provide a digital setting circuit wherein a straight-line-segment approximation of the operating characteristic of a sensor, such as the temperature characteristic of a measuring resistor or the temperature-electromotive force characteristic of a thermocouple or the like, is provided by means of a digital setting arrangement built in a bridge circuit.

DETAILED DESCRIPTION OF THE INVENTION

Figure 1:
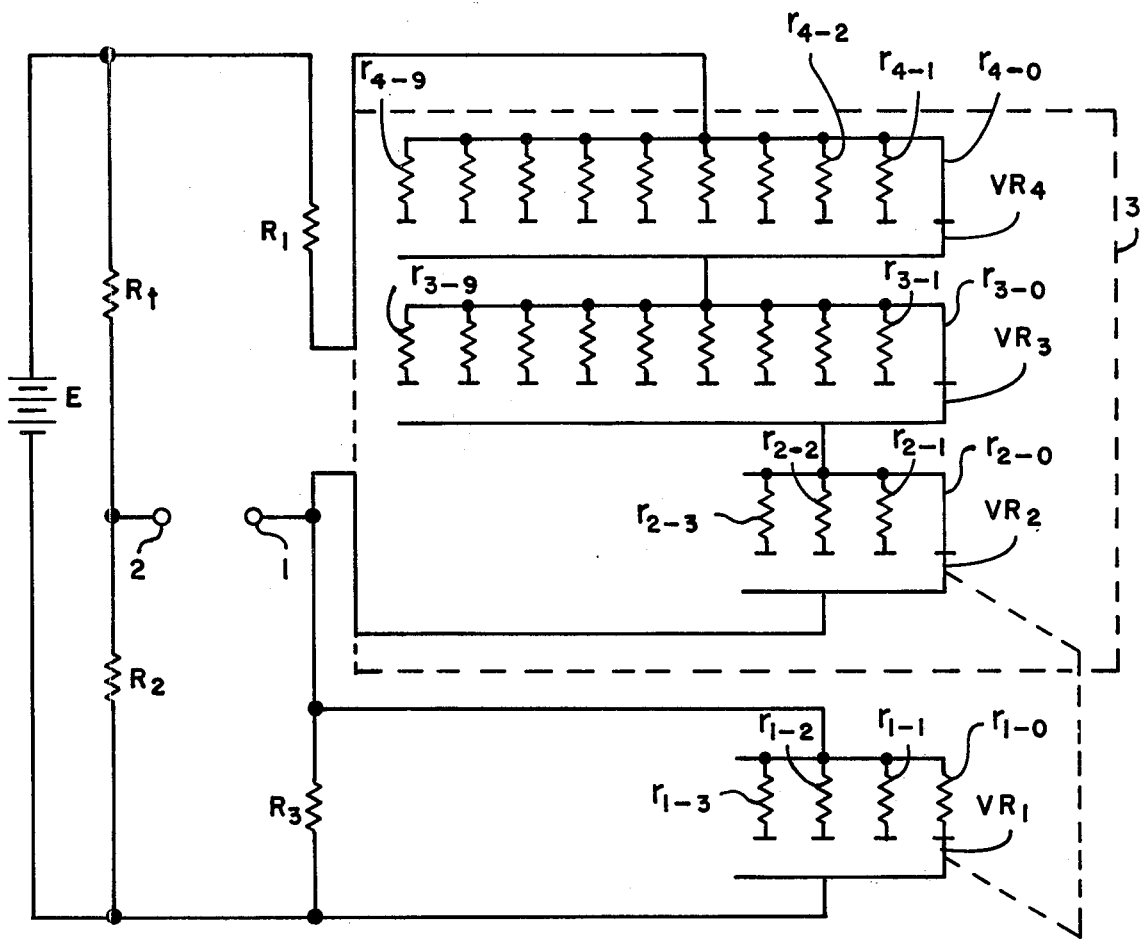
FIG. 1 is a circuit diagram of a digital setting circuit as an embodiment of this invention for use with measuring resistors.

An embodiment of this invention will now be described in detail with reference to the accompanying drawings. In FIG. 1, a measuring resistor $R_t$ and a resistor $R_2$ in the proportion arms and voltage divider resistors $R_3$ and $R_1$ in the setting arms are connected so as to constitute four respective arms of a bridge circuit with a detecting terminal 1 connected to the junction point of the resistors $R_1$ and $R_3$ and a detecting terminal 2 connected to the junction point of the measuring resistor $R_t$ and the resistor $R_2$, the deviation output being available across these detecting terminals.

Figure 2:
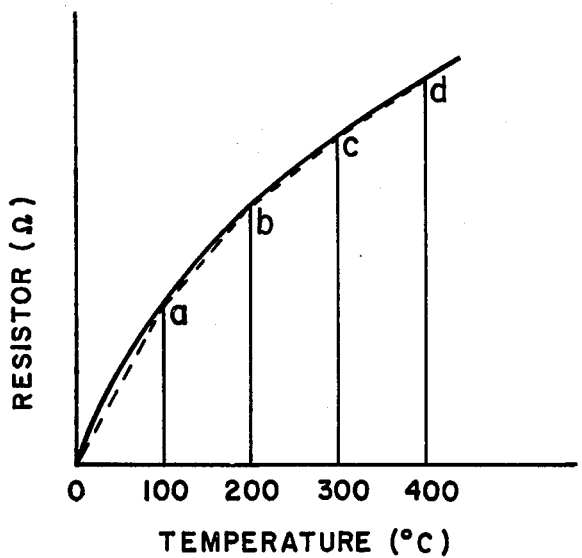
FIG. 2 is a graph illustrating the temperature-resistance characteristic of the measuring resistor and the setting arrangement used in the setting circuit of FIG. 1.

Further, a D.C. source E is provided for supplying a predetermined voltage across the junction point of the measuring resistor $R_t$ in the proportion arm and the resistor $R_1$ in the setting arm and the junction point of the resistor $R_2$ in the proportion arm and the resistor $R_3$ in the setting arm. A high-resistance selector switch $VR_1$ comprising a plurality of resistor elements $r_{1-0}, r_{1-1} \ldots r_{1-3}$ is connected in parallel to the resistor $R_3$ for switching in four steps a constant current flowing through the resistors $R_1$, $VR_2$, $VR_3$, $VR_4$ and $R_3$ in the setting arms. The resistor $R_3$ can be omitted if the values of the resistor elements $r_{1-0}, r_{1-1}, \ldots r_{1-3}$ are properly selected. If the resistor $R_3$ is connected in series to the selector switch, this series circuit will be able to accomplish the same function as in parallel circuit $R_3$ and $VR_1$. Selector switches $VR_2$, $VR_3$, and $VR_4$ are digital selector switches connected in series in that order to constitute a setting arrangement for the manual setting of a set value, which in turn is connected in series to the resistor $R_1$, the switch $VR_2$ corresponding to the digit of hundreds, $VR_3$ the digit of tens and $VR_4$ the digit of units. The selector switch $VR_2$ for the most significant digit comprises a plurality of resistor elements $r_{2-0}, r_{2-1}, \ldots r_{2-3}$ which correspond to temperatures 0°C, 100°C, ... 300°C for set points o, a, ..., c, respectively, as shown in FIG. 2. The resistor elements $r_{2-0}, r_{2-1}, \ldots r_{2-3}$ are interlocked with the resistor elements $r_{1-0}, r_{1-1}, \ldots r_{1-3}$, respectively, of the high-resistance selector switch $VR_1$ so that the interrelation between the resistor elements of both switches may provide a straight-line-segment approximation of the temperature-resistance characteristic of the measuring resistor. The selector switches $VR_3$ and $VR_4$ both comprise ten resistor elements, namely $r_{3-0}, r_{3-1}, \ldots r_{3-9}$ and $r_{4-0}, r_{4-1} \ldots r_{4-9}$, the resistance values of which increase stepwise so that their combination provides 100 resistance values. Although the selector switches $VR_1$, $VR_4$, $VR_3$ and $VR_2$ are shown in FIG. 1 as parallel switches whose resistance values increase stepwise, it will be obvious to utilize their equivalent circuits by employing series resistors with taps.

The operation of this embodiment of the present invention will now be described with reference to FIG. 2 which is a temperature-resistance characteristic chart of the measuring resistor. Initially it is assumed that the selector switches $VR_3$ and $VR_4$ are fixed to zero (i.e. $r_{3-0} = 0$, $r_{4-0} = O$). As the value of the parallel resistance $$R_3 // \ r_{1-0} \ \frac{(= R_3 \ r_{1-0})}{R_3 + r_{1-0}}$$

is higher than those of the resistor $R_1$ and the resistor element $r_{2-0}$ of the setting arrangement, a current flowing through the setting arms will be kept substantially constant if the selector switches $VR_3$ and $VR_4$ are changed over. This parallel resistance defines the slope for 0° – 99°C or O – a as is shown by a dotted line in FIG. 2. Although the slope is thus determined, the approximation of the temperature-resistance characteristic of the measuring resistor is not always attained. Because of this, the selector switch $VR_1$ is interlocked with the most significant digit selector switch $VR_2$, and by making the value of the resistor element $r_{2-0}$ zero and that of the resistor $R_1$ a proper one it is achieved that the point 0 agrees with the origin and the point a the coordinate of the temperature-resistance characteristic of the measuring resistor at 100°C. Subsequently, the selector switches $VR_3$ and $VR_4$ are adjusted. The selector switches $VR_3$ and $VR_4$ correspond to the tens digit and the units digit, respectively, of the temperature value so that the resistance value is capable of changing in 100 steps. Through this change the setting arm current varies a little, but can be regarded as substantially constant. Temperatures between 0°C and 99°C can thus be set in the digital fashion. In like manner, temperatures between 100°C and 199°C or the points a and b can be set in the digital fashion. More particularly, the slope between a and b or the parallel resistance $$R_3//r_{1-1} \quad \frac{(=R_3\ r_{1-1})}{R_3+r_{1-1}}$$

is determined from the temperature-resistance characteristic of the measuring resistor, and subsequently the value of the resistor element $r_{2-1}$ is determined so that both line-segments may join at the designated point a. An alternative structure is that the resistor $R_1$ is omitted and substitutionally its value is added to the resistor elements of the selector switch $VR_2$. In this manner, straight-line-segments $o - a - b - c - d$ approximating the temperature-resistance characteristic of the measuring resistor are determined, and the detecting terminals 1 and 2 of the bridge circuit provide a deviation voltage which is based on a resistance value on the straight-line-segments corresponding to the set point temperature and the resistance value of the measuring resistor itself. Although in the embodiment the selector switch $VR_2$ is shown divided into four steps from 0° - 399°C or $o - a - b - c - d$, such division may obviously be altered freely according to the scale span. It is also obvious that the selector switch $VR_4$ can be omitted if the precision to a lower significant digit is not required and that another selector switch may be increased in response of the precision to the measuring.

Figure 3:
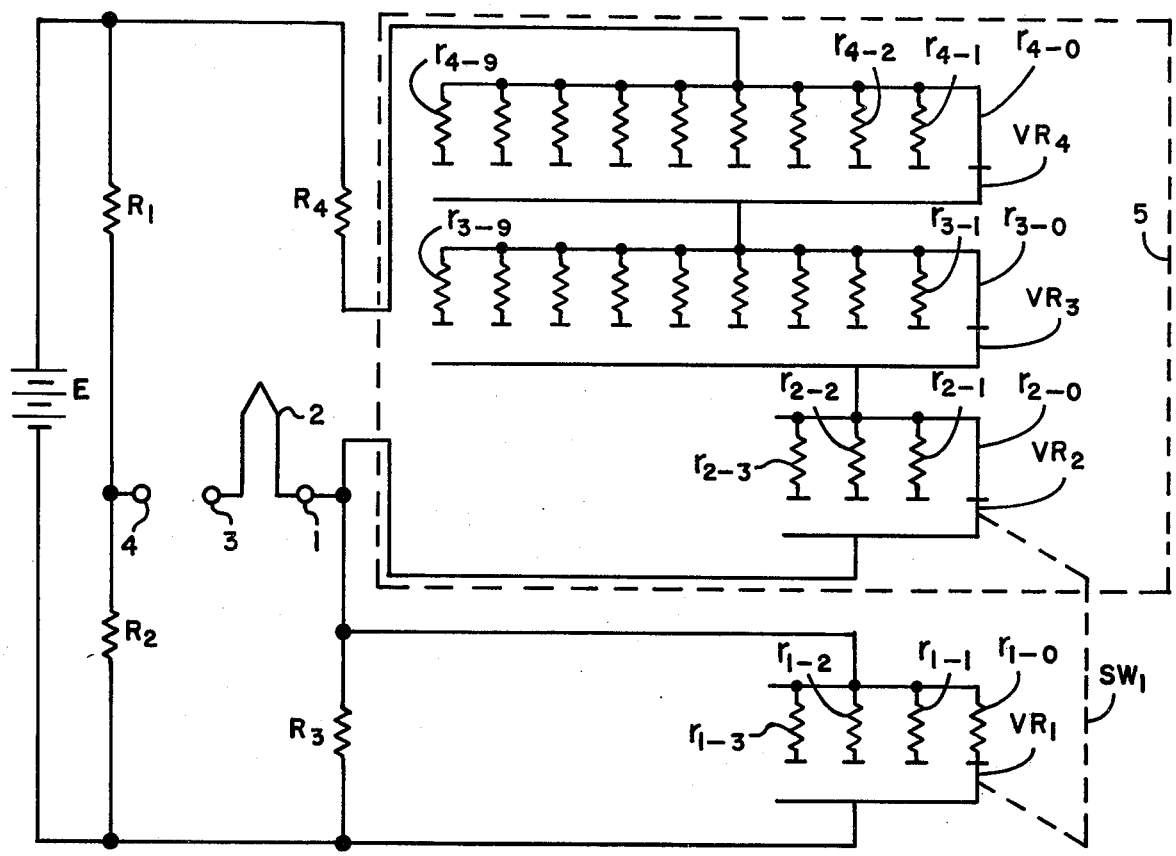
FIG. 3 is a circuit diagram of a digital setting circuit as an embodiment of this invention for use with thermocouples; and, FIG. 4 is a graph illustrating the voltages from the thermocouple used in the setting of FIG. 3.

The digital set point device is also useful for characterizing other types of sensors such as the thermocouple shown in FIG. 3. As can be seen from a comparison of FIGS. 1 and 3, they are substantially alike and the same reference numerals have been used to depict the same elements which appear in both circuits.

In FIG. 3 resistors $R_1$ and $R_2$ in the proportion arms and voltage divider resistors $R_3$ and $R_4$ in the setting arms are connected so as to constitute the four respective arms of the bridge circuit. One of the terminals of a thermocouple 2 is connected to a detecting terminal 1 which in turn is connected to the junction point of the resistors $R_3$ and $R_4$ in the setting arms, and the deviation output is available across a terminal 3 connected to the other terminal of the thermocouple 2 and a terminal 4 connected to the junction point of the resistors $R_1$ and $R_2$ in the proportion arms.

Figure 4:
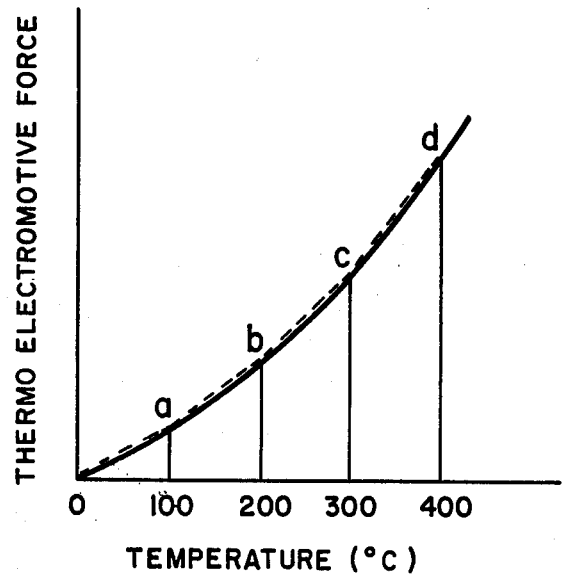

The operation of this embodiment of the present invention will now be described with reference to FIG. 4 which is a temperature-electromotive force characteristic chart of the thermocouple. Initially, it is assumed that the selector switches $VR_3$, and $VR_4$ are fixed to zero (i.e. $r_{3-0} = 0$, $r_{4-0} = 0$). As the value of the parallel resistance $$R_3//r_{1-0} \quad \frac{(=R_3\ r_{1-0})}{R_3+r_{1-0}}$$

is higher than those of the resistor $R_4$ and the resistor element $r_{2-0}$ of the setting arrangement a current flowing through the setting arms will be kept substantially constant if the selector switches $VR_3$ and $VR_4$ are changed over. This parallel resistance defines the slope for 0° - 99°C or $0 - a$ as is shown by a dotted line in FIG. 4. Although the slope is thus determined, the approximation of the temperature-electromotive force characteristic of the thermocouple is not always attained. Because of this, the selector switch $VR_1$ is interlocked with the most significant digit selector switch $VR_2$, and by making the value of the resistor elements $r_{2-0}$ zero and that of the resistor $R_4$ a proper one the point o agrees with the origin and the point a agrees with the characteristic of the thermocouple electromotive force at 100°C. Subsequently the selector switches $VR_3$ and $VR_4$ are adjusted. The selector switches $VR_3$ and $VR_4$ correspond to the tens digit and the units digit, respectively, of the temperature value so that the resistance value is capable of changing in 100 steps. Through this change the setting arm current varies a little, but can be regarded as substantially constant. Temperatures between 0°C and 99°C can thus be set in the digital fashion. In like manner, temperatures between 100° and 199°C or the points a and b can be set in the digital fashion. More particularly, the slope between a and b or the parallel resistance $$R_3//r_{1-1} \quad \frac{(=R_3\ r_{1-1})}{R_3+r_{1-1}}$$

is determined from the temperature-electromotive force characteristic of the thermocouple, and subsequently the value of the resistor elements $r_{2-1}$ is determined so that both line-segments may join at the designated point a. An alternative structure is that the resistor $R_4$ is omitted and substitutionally its value is added to the resistor elements of the selector switch $VR_2$. In this manner, straight-line-segments $0 - a - b - c - d$ approximating to the temperature-electromotive force characteristic of the thermocouple are determined, and the detecting terminals 1 and 4 of the bridge circuit provide a voltage on the straight-line-segment corresponding to the set temperature. Although in this embodiment the selector switch $VR_2$ is shown as being divided into four steps according to 0° - 399°C or $0 - a - b - c - d$, such division may obviously be altered freely according to the scale span. It is also obvious that the selector switch $VR_4$ can be omitted if the precision to a lower significant digit is not required and that another selector switch may be increased in response of the precision to the measuring.

The embodiments of the invention in which an exclusive property or privilege is claimed:

1. A digital set point circuit comprising:
    a pair of input terminals;
    a pair of output terminals;
    a bridge circuit having at least first, second, third and fourth impedance arms, said first and third impedance arms being connected together and to one of said input terminals, said second and fourth impedance arms being connected together and to the other of said input terminals, said first and second impedance arms being connected together and to one of said output terminals and said third and fourth impedance arms being connected together and to the other of said output terminals, said circuit containing sensor means;
    one of said impedance arms comprising at least a most significant digit selector switch for switching between a plurality of digital set point devices; and,
    another of said arms comprising a characterizing switch interlocked with said most significant digit selector switch, said characterizing switch for switching a plurality of characterizing devices, each characterizing device having a value associated with each digital set point device for providing an approximation of the operating characteristic of said sensing means to provide a substantially linear output from said bridge.

2. The digital set point circuit of claim 1 wherein said digital set point devices comprise a plurality of resistors and wherein said most significant digit selector switch has a plurality of switch positions, each position corresponding to an associated one of said plurality of resistors wherein each switch position corresponds to a digit position of set point value.

3. The digital set point circuit of claim 2 further comprising a next most significant digit selector switch for switching between a plurality of second digital set point devices.

4. The digital set point circuit of claim 3 wherein each of said characterizing devices comprises a resistor having a value associated with a corresponding resistor of said digital set point devices for providing an approximation of the operating characteristic of said sensing means.

5. The digital set point circuit of claim 4 wherein said sensing means comprises a measuring resistor and wherein said operating characteristic is the temperature-resistance characteristic of said measuring resistor.

6. The digital set point circuit of claim 5 wherein said measuring resistor comprises the impedance of said first arm, a first resistor comprises the impedance of said second arm, said most significant digit selector switch and said plurality of digital set point devices comprising the impedance of said third arm and said characterizing switch, and said characterizing devices comprises the impedance of said fourth arm.

7. The digital set point circuit of claim 4 wherein said sensing means comprises a thermocouple and wherein said operating characteristic is the temperature-electromotive force characteristic of said thermocouple.

8. The digital set point circuit of claim 7 wherein a first resistor comprises the impedance of said first arm, a second resistor comprises the impedance of said second arm, said most significant digit selector switch and said plurality of digital set point devices comprises the impedance of said third arm, said characterizing switch and said plurality of characterizing devices comprises the impedance of said fourth arm, and said thermocouple is connected to said other output terminal.

* * * * *